(12) United States Patent
Kirjavainen et al.

(10) Patent No.: US 6,306,326 B1
(45) Date of Patent: Oct. 23, 2001

(54) EXTRUSION METHOD, EXTRUDER AND EXTRUDED PRODUCT

(75) Inventors: Kari Kirjavainen, Espoo; Jyri Järvenkylä, Hollola, both of (FI)

(73) Assignee: Uponor Innovation AB (SE)

( * ) Notice: Subject to any disclaimer, the term of this patent is extended or adjusted under 35 U.S.C. 154(b) by 0 days.

(21) Appl. No.: 09/599,748

(22) Filed: Jun. 22, 2000

Related U.S. Application Data

(63) Continuation of application No. 09/155,024, filed as application No. PCT/FI97/00250 on Apr. 28, 1997.

(30) Foreign Application Priority Data

| Apr. 29, 1996 | (FI) | 961822 |
| May 8, 1996 | (WO) | PCT/FI96/00261 |
| Dec. 12, 1996 | (FI) | 964988 |

(51) Int. Cl.$^7$ ............................................... D01D 5/20
(52) U.S. Cl. ........................ 264/167; 264/177; 425/382.3
(58) Field of Search ................................. 264/167, 177; 425/382.3

(56) References Cited

U.S. PATENT DOCUMENTS

| 3,314,108 | 4/1967 | Wienand et al. | 18/12 |
| 3,689,181 | 9/1972 | Maxwill | 425/207 |
| 3,705,779 | 12/1972 | Zon | 425/326 |
| 3,776,679 | 12/1973 | Hegler | 425/325 |
| 4,006,599 | 2/1977 | Hegler | 61/11 |
| 4,300,840 | 11/1981 | Kishihiro | 366/88 |
| 4,898,924 | * | 2/1990 | Chenevey et al. | 528/187 |
| 5,060,698 | 10/1991 | Anastassakis | 138/154 |
| 5,156,785 | 10/1992 | Zdrahala | 264/108 |
| 5,387,386 | 2/1995 | Kirjavainen | 264/173 |
| 5,538,411 | 7/1996 | Gates | 425/133.1 |
| 5,690,972 | 11/1997 | Planeta | 425/133.1 |

FOREIGN PATENT DOCUMENTS

| 1092186 | 11/1960 | (DE) . |
| 1918567 | 10/1970 | (DE) . |
| 0102096 | 3/1984 | (EP) . |
| 0340655 | 11/1989 | (EP) . |
| 0422042 | 1/1995 | (EP) . |
| 0636644 | 2/1995 | (EP) . |
| 2202783 | 10/1988 | (GB) . |
| 7314530 | 12/1995 | (JP) . |
| 9710941 | 3/1997 | (WO) . |

OTHER PUBLICATIONS

Derwent Abstract of JP 7314530 of Dec. 1995.

* cited by examiner

Primary Examiner—Edward J. Cain
(74) Attorney, Agent, or Firm—Ladas and Parry

(57) ABSTRACT

An extruder according to the invention comprises at least two annular conical feed gaps (9) one within the other, formed between a rotatable rotor (1) and a stator (4, 5). At least some of the material to be extruded is subjected in the different feed gaps (9) of the extruder alternately to a higher pressure and then to a lower pressure. The rotor (1) or stator (4, 5) between the feed gaps (9) can then be balanced such that the pressure effect provides a hydrodynamic bearing, whereby, when the extruder is used, even at worst a very small force is exerted on the other bearings of the rotor (1) or stator (4, 5). By the method of the invention, a product can also be produced which contains cross-linked and at least partly oriented polyethylene.

7 Claims, 4 Drawing Sheets

EXTRUSION METHOD, EXTRUDER AND EXTRUDED PRODUCT

Figure 1:
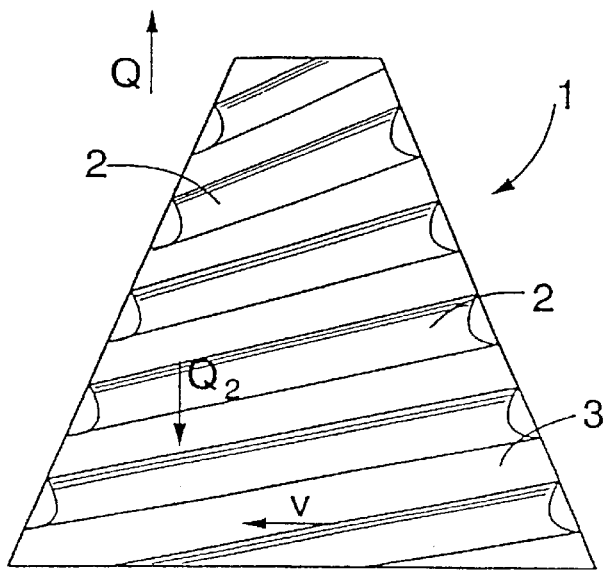

This application is a continuation of copending application Ser. No. 09/155,024 filed on Sep. 17, 1998, which is International Application PCT/FI97/00250 filed on Apr. 28, 1997 and which designated the U.S., claims the benefit thereof and incorporates the same by reference.

The invention relates to an extrusion method in which material is extruded by an extruder comprising at least two annular conical feed gaps one within the other, provided between a rotatable rotor and a stator; in the method, extrudable material is extruded from the extruder by means of primarily helical curve-shaped grooves located in the rotor and/or the stator between the rotor and the stator and by means of flights located between the grooves.

The invention also relates to an extruder that comprises at least two annular conical feed gaps one within the other, provided between a rotatable rotor and a stator; the rotor and/or stator comprising at least primarily helical curve-shaped grooves and flights between them to extrude the extrudable material from the extruder.

The invention further relates to a product extruded with the method.

U.S. Pat. No. 3,314,108 discloses an extruder comprising two conical stators and a conical rotor rotatably arranged between the stators. The plastic material to be extruded is supplied via two different conduits to different sides of the rotor. The rotor is provided with helical grooves by means of which the material is transferred towards an orifice at the narrower end of the extruder. The flows of material on different sides of the rotor exert a force on the rotor, whereby the bearings of the rotor must be very firm. Further, the clearances between the rotor and the stator should be adjusted carefully so as to prevent a back flow of the extrudable material back toward the material inlet. A small clearance is naturally a difficult structure to implement, and excess friction is easily generated between the rotor and the stators. On the other hand, a bigger clearance would add to the back flow and thereby reduce extruder output.

EP 0,422,042 discloses an extruder with a plurality of conical stators and conical rotors rotatably arranged between them. The extrudable material is fed via one conduit to the forward end of each rotor, the rotor comprising, at the inlet, holes through which the material can also flow to the other side of the rotor. The material is transported to the end of the extruder by means of grooves arranged on both sides of the rotor. The different sides of the rotor are also subject to great forces in this device, requiring firm bearings. A further problem is a back flow over the flights between the grooves back toward the material inlet and an accurate arrangement of clearances between the rotors and stators.

U.S. Pat. No. 3,689,181 discloses an extruder comprising a plate-like rotor and a plate-like stator. Recesses and protrusions are arranged in the rotor and the stator so as to improve the mixing of the material. The material is extruded from the extruder mainly by centripetal force, making the extruder quite ineffective. Furthermore the structure of the extruder is such that it requires very firm bearings.

GB 2,202,783 describes an extruder with a plurality of partially conical rotors on top of each other. The rotors are provided with grooves that transport the extrudable material out of the extruder. The grooves may be provided with mixing means, e.g. rods, to reduce the cross-sectional area of the groove. These means mix the material, but they significantly hamper material flow and thus reduce extruder output.

It is an object of this invention to provide an extrusion method and an extruder in which the above drawbacks can be avoided. It is a further object of the invention to provide an extruded product with good characteristics.

The extrusion method of the invention is characterized in that at least part of the extrudable material is subjected alternately to higher and lower pressure in the feed gaps of the extruder, the flow rate of the material alternately increasing and decreasing, and that at least part of the extrudable material is led from one groove to another.

The extruder of the invention is further characterized in that the extruder is arranged to subject at least part of the extrudable material alternately to higher and lower pressure and to lead at least part of the extrudable material from one groove to another.

The extruded product of the invention is further characterized in that the product contains orienting material, such as liquid crystal polymer.

It is an essential idea of the invention that the extruder comprises at least two annular conical feed gaps one within the other, and that at least part of the extrudable material is subjected alternately to a higher and then to a lower pressure in the different feed gaps of the extruder. The idea of a preferred embodiment that in order to provide the desired pressure effect, at least part of the extrudable material is led alternately to a lower and then to a higher space. It is the idea of another preferred embodiment that the flights between the grooves that supply the extrudable material are bevelled so that the extrudable material can flow in the circumferential direction of the device, but owing to the pressure effect, axial back flow can be prevented. The idea of a third embodiment that the groove supplying material is arranged to become shallower and deeper in the flow direction of the material, and at the end of the shallowing portion the rotor or stator between the feed gaps comprises an hole via which at least part of the material can flow to the other side of the rotor or stator. If desired, the holes can be formed conical, i.e. they can be arranged to converge.

It is an advantage of the invention that by a varying pressure effect on different sides of the rotor or stator the rotor or the stator enables balancing the rotor or stator between two different feed gaps so that the pressure effect provides a hydrodynamic bearing, the other bearings of the rotor or the stator being subject to little or no force at all during operation of the extruder, whereby the structure of the other bearings can be lighter since they do not need to endure great forces during their whole service life. A further advantage is that the extrudable material can be efficiently mixed. When the material is led alternately to a lower and a higher space, the extrudable material can be heated further by friction heat generated by shear forces. At the same time heat transmission and consequently temperature equalisation improves as the materials pass via a lower space. Furthermore, as the product is subjected to a higher pressure, a product can be produced in which orientation can be generated as the flow cross-sectional surface converges. By arranging holes in the rotor or the stator through which the material supplied to the lower point can flow from one feed gap to another, the possible pressure difference in different parts of the rotor or stator can be evened out, which further reduces the force exerted on the rotors or the stators. When the holes are arranged to converge, the material passing through can be oriented in the converging through-holes. When the flights between the grooves that transport the material are bevelled, in the flight will be formed a pressure function, by the action of which the axial back flow of the equipment can be reduced. The clearance between the rotor and the stator can, however, also be made bigger without excessive increase in the back flow, the friction between the rotor and the stator being reduced to a minimum.

Figure 2:
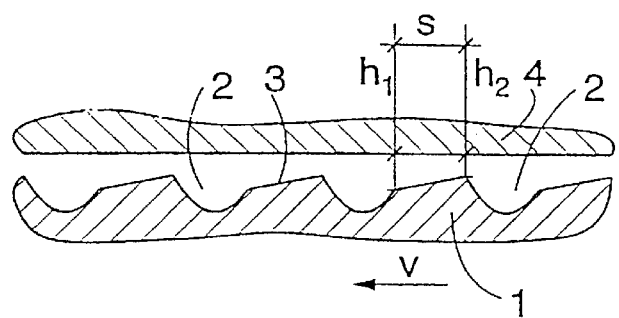
Figure 3:
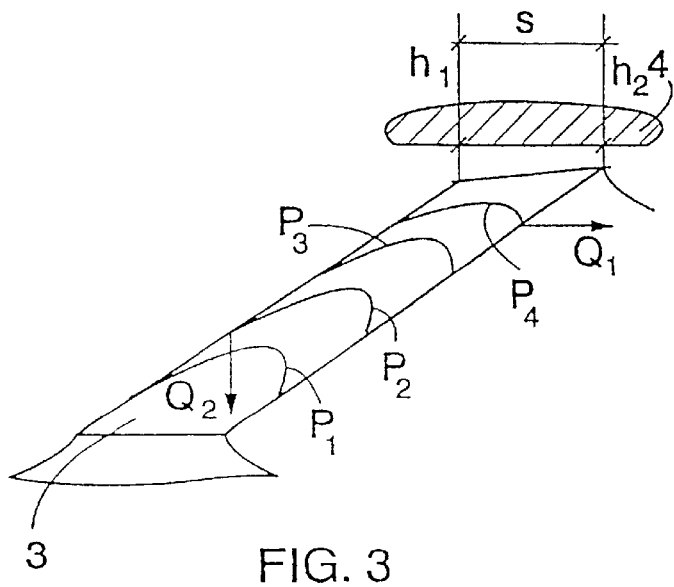
Figure 4:
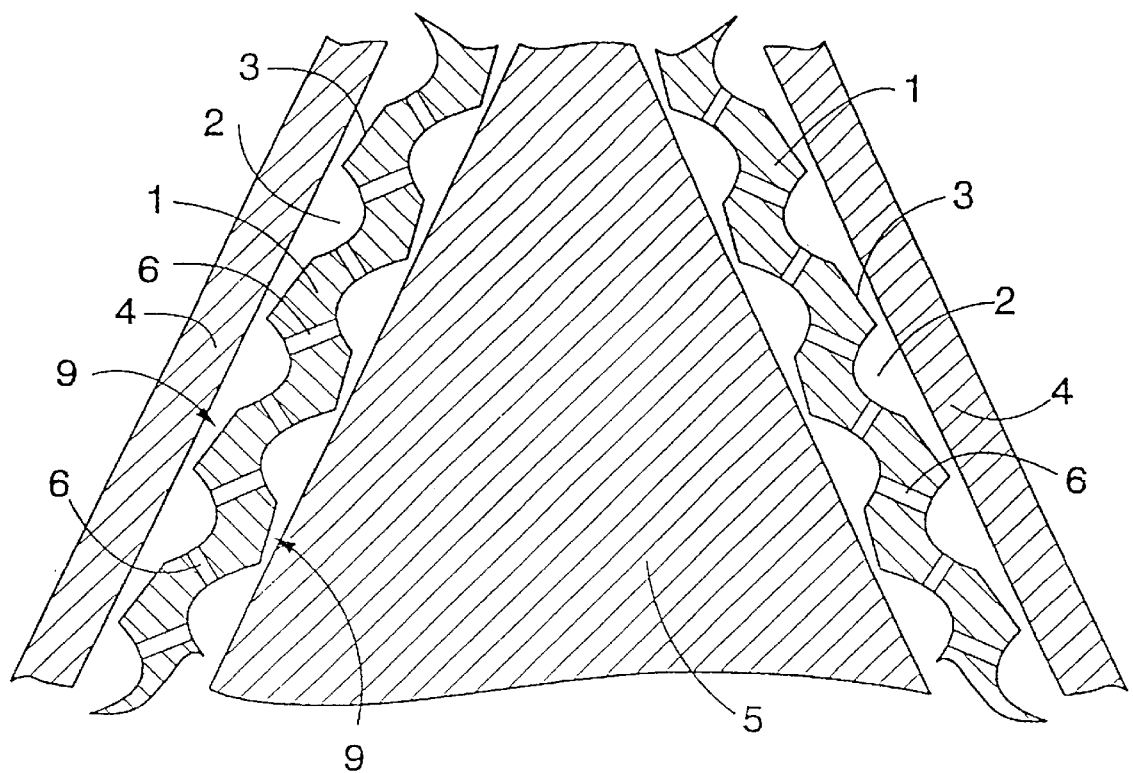
Figure 5:
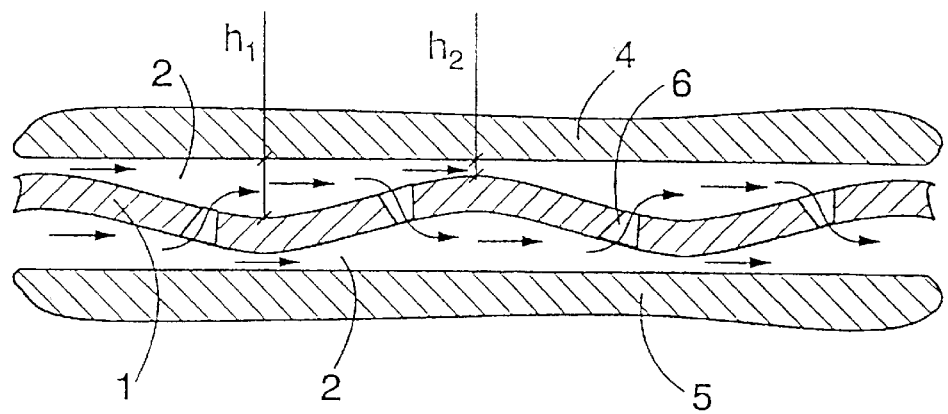
Figure 6:
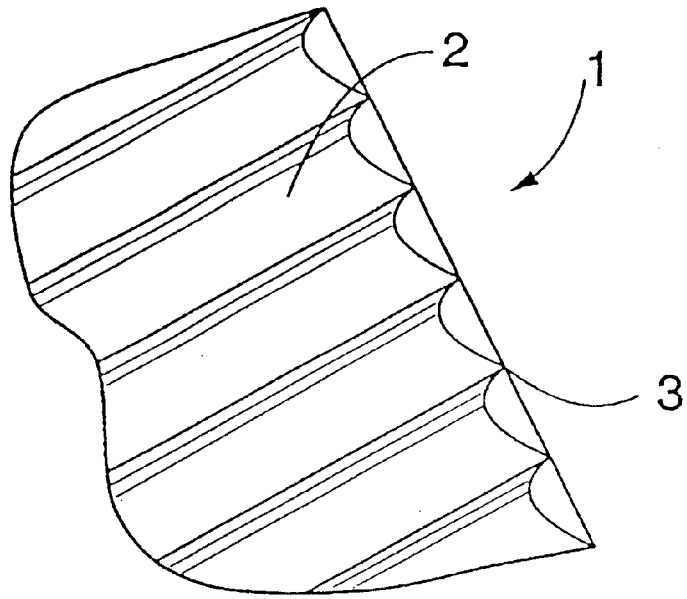
Figure 7:
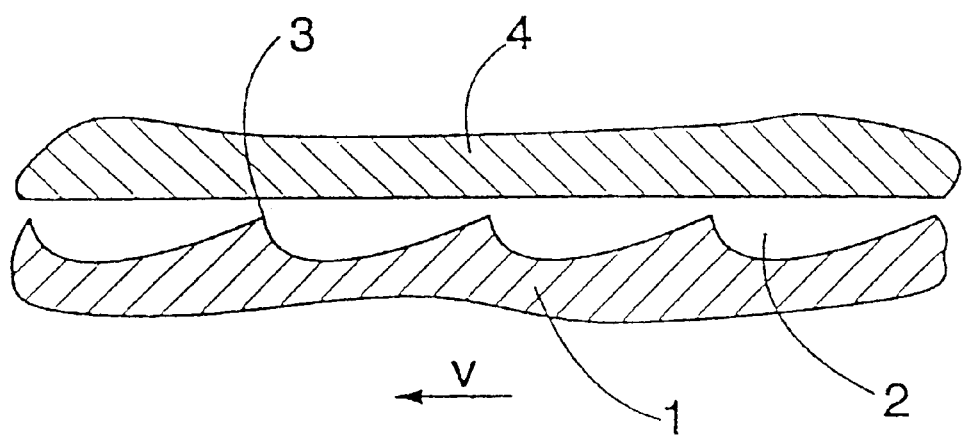
Figure 8:
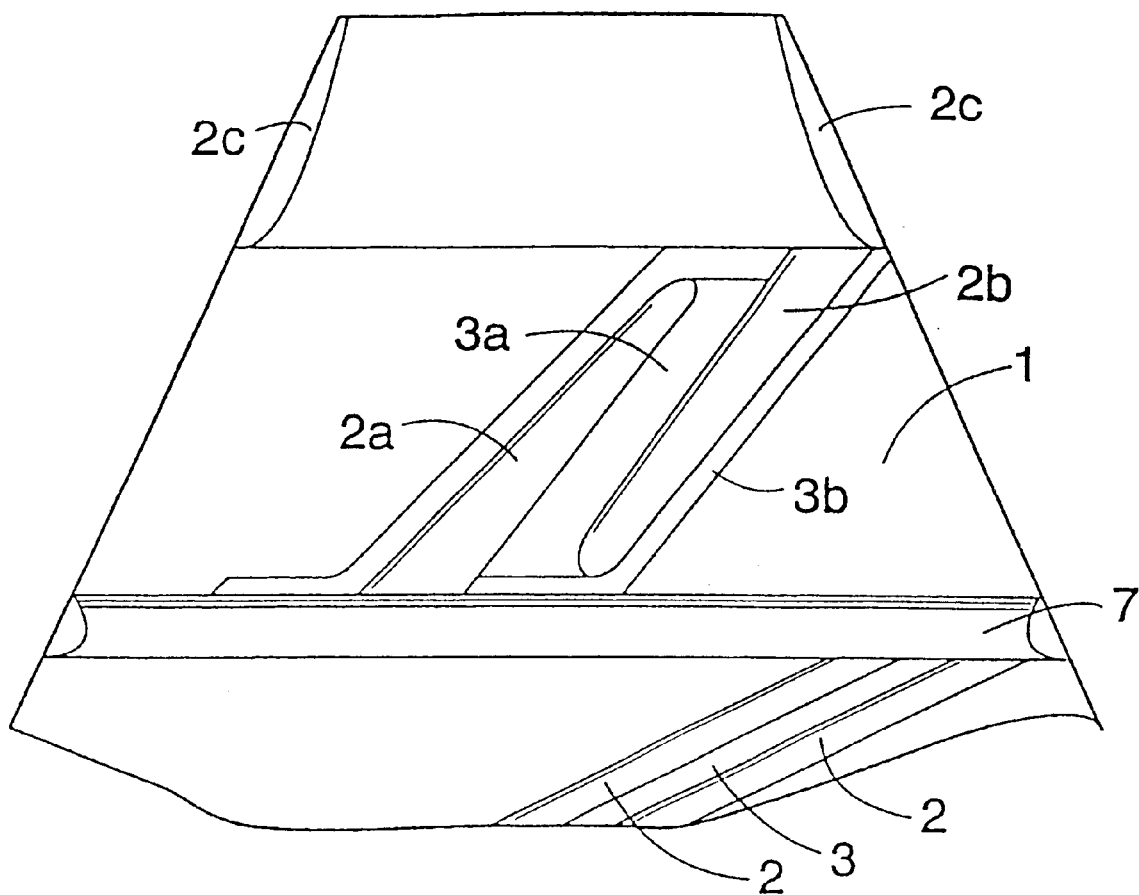
Figure 9:
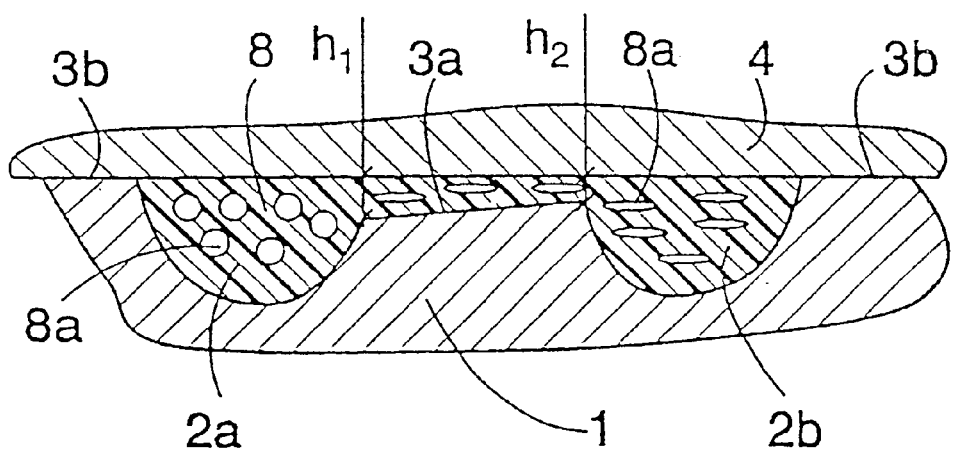

The invention will be described in more detail in the attached drawings, in which FIG. 1 is a schematic side view of the rotor of an extruder according to the invention, FIG. 2 is a cross section of a part of the rotor according to FIG. 1, FIG. 3 schematically shows the pressure functions of a flight between the grooves of a rotor according to FIG. 1, FIG. 4 is a schematic cross-sectional side view of another extruder according to the invention, FIG. 5 shows the device according to FIG. 4 in cross section in the direction of the rotor grooves, FIG. 6 is a schematic side view of a rotor part of a third extruder according to the invention, FIG. 7 is a cross section of a part of the rotor of FIG. 6, FIG. 8 is a schematic side view of the rotor of a fourth device according to the invention, and FIG. 9 is a schematic cross-sectional view of a detail of the rotor according to FIG. 8 in the axial direction.

FIG. 1 is a schematic side view of a rotor 1. The rotor 1 comprises helical curve-shaped grooves 2, by the action of which the extrudable material moves upward in the figure while the rotor rotates at a circumferential speed v. The extrudable material is supplied to the wider end of the rotor 1 in a manner known per se. For the sake of clarity, the supply means and the rotor 1 rotation means are not shown in the Figure. Flights 3 are arranged between the helical curve-shaped grooves 2. Extruder output is denoted by arrow Q, and the back flow of the extrudable material from the grooves 2 over the flights 3 in the axial direction, i.e. downward in FIG. 1, by arrow $Q_2$.

FIG. 2 is a cross-sectional view a part of the rotor according to FIG. 1 seen in the axial direction and from below. The numbering in FIG. 2 corresponds to that of FIG. 1. For the sake of clarity, the rotor 1 and an outer stator 4 disposed outside the rotor are shown as having a straight surface between them, although they are naturally circular in the direction from which they are seen. The flight 3 is bevelled so that clearance $h_1$ between the rotor 1 and the stator 4 at the front edge of the flight 3 in the direction of rotation of the rotor 1 is bigger than clearance $h_2$ at the rear edge of the flight 3. The width of the flight 3 in the circumferential speed v direction is denoted by s.

FIG. 3 shows pressure functions of the flight 3 between the rotor 1 grooves 2. The numbering in FIG. 3 corresponds to that of FIGS. 1 and 2. Pressure functions $P_1$ to $P_4$ represent pressure functions at different points of the flight 3, the pressure function $P_1$ standing for a pressure function at a lower point of the rotor in FIG. 1 than pressure functions $P_2$ to $P_4$, and pressure function $P_4$ standing for a pressure function at a higher point than pressure functions $P_1$ to $P_3$, pressure functions $P_2$ and $P_3$ being naturally between them. The maximum value of a pressure function is directly proportional to the viscosity η of the extrudable material, the circumferential speed v of the rotor 1, and the width s of the flight, and inversely proportional to the size of the clearance $h_1$, $h_2$ between the rotor 1 and the stator 4. The maximum value $P_{max}$ of a pressure function may be presented by means of the formula:

$$P_{max} = \eta \times v \times s \div (h_1 + h_2)^2.$$

Since the extrudable material is fed into the wider end of the rotor 1, its viscosity η is at its highest in the lower portion in FIG. 1, diminishing as the material melts and softens as it moves towards the upper end of the rotor 1. Likewise, the circumferential speed v of the rotor 1 is naturally at its highest at the widest point of the rotor. Consequently, the pressure function is greater at the wider part of the rotor 1 than at the narrower part. This means that the back flow $Q_2$ advancing in the axial direction is always subjected to a pressure function that is greater that the current pressure function, whereby the back flow $Q_2$ is reduced. Surprisingly, this brings about the advantage that although the flow $Q_1$ in the peripheral direction is relatively great due to the bevelled shape of the flight 3, the back flow $Q_2$, however, is not very great. Consequently extruder output Q remains good. The rotor 1 is designed to be such that the pressure according to FIG. 3 is generated both outside and inside the rotor. This rising and falling pressure provides a hydrodynamic bearing between the rotor and the stator. The variation in pressure also alternating increases and decreases the material flow rate. By the action of the pressures on the different sides of the rotor 1, the rotor 1 reaches an equilibrium such that the rotor always moves further away from the stator on the side of which the pressure is higher and vice versa. In this way the clearance between the rotor 1 and the stators may adjust automatically. The pressure function receives its energy from the circumferential speed v rotating the rotor 1.

FIG. 4 is a schematic cross-sectional side view of another extruder according to the invention. The numbering of FIG. 4 corresponds to that of FIGS. 1 to 3. Outside the conical rotor 1 there is a conical outer stator 4 and inside it a likewise conical inner stator 5. The concept conical as used in this application implicates that the shape of the device is conical at least as regards the feed and melt zones. The end portion of the device may be e.g. cylindrical or of the shape of an expanding cone. In this case both sides of the rotor comprise an annular conical feed gap 9, disposed one within the other. The flight 3 is formed such that, as seen in FIG. 4, the clearance between its upper edge and the stator is bigger than the clearance between the lower edge of the flight 3 in the Figure. The travel direction of the extrudable material in FIG. 4 is from below upwards. The rotor 1 comprises holes 6 through which at least part of the extrudable material can flow from one side of the rotor 1 to the other side, from one feed gap 9 to another.

FIG. 5 is a cross-sectional view of the rotor of FIG. 4 in the direction of its grooves. The numbering of FIG. 5 corresponds to that of FIGS. 1 to 4. The grooves 2 are arranged to become alternately shallower and deeper in the flow direction of the extrudable material. As a result, when the extrudable material moves from the bigger clearance $h_1$ to the smaller clearance $h_2$, it is subjected to a greater pressure. The higher pressure on the extrudable material is partially released as the groove 2 becomes deeper, and partly as the extrudable material moves through the hole 6 to the other side of the rotor 1. This way the above described advantageous bearing effect is brought about by the action of a higher and a lower pressure. Because of the hydrodynamic bearing effect, essentially no other bearing application is needed when the extruder is used. Should any other bearing application be used, it is preferably arranged at the widest part of the rotor, and thus the supporting effect of such bearing application will be optimal and there will be no welt line. Furthermore, because of the holes 6, the possibly different pressures on different sides of the rotor 1 can even out, whereby no great unilateral force can affect the rotor. In FIG. 5 the flow paths of the extrudable material are illustrated by arrows. The holes 6 may be conical, i.e. converge in the direction of the material flow. This way the material flowing through the holes 6 is subjected to orientation in the converging through-holes 6.

FIG. 6 is a schematic side view of a part of the rotor of a second extruder according to the invention. The numbering of FIG. 6 corresponds to that of FIGS. 1 to 5. The grooves 2 are shaped such that the depth of a groove changes in the transverse direction so that the deepest point of the groove is close to the upper edge of the groove 2 in FIG. 6. The flight 3 again is arranged to be narrow and sharp.

FIG. 7 shows a cross section of the rotor part of to FIG. 6 seen in the axial direction from below. The numbering of FIG. 7 corresponds to that of FIGS. 1 to 6. FIG. 7 clearly shows the shape of the groove 2, i.e. the front edge of the groove 2 is more steeply bevelled than the rear edge. FIG. 7 further shows the narrow and sharp shape of the flight 3.

FIG. 8 is a schematic side view of the rotor of a fourth device according to the invention. The numbering of FIG. 8 corresponds to that of FIGS. 1 to 7. The lower part of the rotor 1 comprises normal grooves 2 for extruding extrudable material upward in the Figure. From the grooves 2 the extrudable material is transported to a ring groove 7 and from the ring groove 7 to a first auxiliary groove 2a. From the first auxiliary groove 2a the material passes over an intermediate flight 3a to a second auxiliary groove 2b and from there further via discharge grooves 2c out of the extruder. The rotor 1 further comprises guide flights 3b that are higher than the intermediate flights 3a, whereby no extrudable material is essentially transported over the guide flights 3b. Instead, essentially all extrudable material is led over the intermediate flight 3a, whereby a the extrudable material is subjected to a pressing pressure at the intermediate flight 3a, the effect of said pressure reducing as the extrudable material passes to the second auxiliary groove 2b. Consequently, the hydrodynamic bearing is obtained by means of the intermediate flight 3a. As regards the balancing of the bearing and the rotor, the first auxiliary groove 2a, and the second auxiliary groove 2b, and the intermediate flight 3a between them need not extend along the length of the entire rotor 1. For the sake of clarity, FIG. 6 only shows some of the grooves 2, 2a to 2c and flights 3, 3a to 3c.

FIG. 9 is a schematic cross-sectional view of a detail of the rotor shown in FIG. 8 seen in the axial direction. The numbering of FIG. 9 corresponds to that of FIGS. 1 to 8. For the sake of clarity, the rotor 1 and the stator 4 are shown in FIG. 9 as having a straight surface between them. Essentially all extrudable material 8 is led from the first auxiliary groove 2a to the second auxiliary groove 2b via the intermediate flight 3a. The clearance $h_1$ of the intermediate flight 3a at the front edge on the side of the first auxiliary groove 2a is bigger than the clearance $h_2$ between the edge on the side of the second auxiliary groove 2b and the stator. The extrudable material 8 may be mainly e.g. polyethylene 8a and additionally contain e.g. crosslinked polyethylene which will become crosslinked in the extruder. While in the groove 2a, the crosslinked polyethylene 8a is still in a spherical form, but when subjected to pressure at the intermediate flight 3a, it orientates to an elliptical form, as illustrated in FIG. 7. In this manner a product containing orienting and crosslinked polyethylene fibres is obtained. This kind of a product is very strong and durable. The extrudable product may be e.g. a plastic tube, a cable sheath, a film or the like. The device according to FIGS. 6 and 7 produces a product whose crosslinked polyethylene fibres 8a are essentially all oriented to an elliptical form. By the device according to FIGS. 1 to 5, at least some of the fibres can be oriented as the flow cross-sectional surface converges into elliptic form. Liquid crystalline plastic, for example, is also a potential extrudable material, and will be defibrated by the stretching effect of the device. Preferably about 5 to 40% of liquid crystalline plastic is mixed with matrix plastics. It is particularly advantageous to use plastic mixtures in which the primary component to be defibrated, such as LCP, is more fluid with respect to viscosity than the matrix plastics. The fibrillation of said component is here intensified as the component is more fluid and hence tends to flow over the flight and is thereby stretched. A similar effect is partly achieved when MD or LD polyethylene, into which a crosslinked component, such as peroxide, has been absorbed, is added to e.g. HDPE plastics. In this case the more flowing ingredient will be fibrillated and simultaneously crosslinked by the action of heat. If the crosslinking agent, such as peroxide, is selected such that it has an extremely accurate reaction temperature, it is possible that only the substance passing over the flight is crosslinked, as the temperature of the process is highest at that point. The device of the invention produces a product in which at least some of the fibres are oriented in the direction of the helix. Glass fibres can also be used as reinforcing fibres.

The drawings and the associated description are intended only to illustrate the invention. The invention may vary in its details within the scope of the claims. If desired, the grooves and flights may thus be arranged in the stators instead of or in addition to the rotor 1. It is also possible to use more than one rotor and two stators. Furthermore, it is possible to use e.g.. only one stator and one rotor outside and inside it, whereby e.g. in the case of FIG. 4, reference number 1 would refer to the stator, and reference numbers 4 and 5 to the rotors. It is essential to the invention, however, that there are at least two annular conical feed gaps 9.

What is claimed is:

1. An extruded product produced by a process comprising:

(a) providing an extruder comprising rotor means and stator means for defining an annular feed gap for receiving the extrudable material and for extrusion of the material from the extruder, said rotor means comprising at least one rotor, said stator means comprising at least one stator, at least one of said rotor or stator means comprising means for conveying the extrudable material received in the feed gap from a first part of the extruder to a second part of the extruder with the rotor means rotating at a circumferential speed and for subjecting the conveyed material alternately to an increase and decrease in pressure;

(b) providing extrudable material that is oriented by an increase and decrease in pressure;

(c) supplying the extrudable material to the extruder with the rotor means rotating at the circumferential speed so as to cause the extrudable material in the form of a polymer melt to be subjected to the increase and decrease in pressure such that it becomes oriented in a helical direction and to be extruded from the extruder; and (d) recovering the extruded product.

2. A product extruded by the method according to claim 1, wherein the product comprises crystalline polymer (LCP).

3. A product according to claim 1, wherein the product comprises crosslinked and at least partly oriented polyethylene.

4. A product according to claim 3, wherein the crosslinked polyethylene is essentially entirely oriented.

5. A product according to claim 3, wherein the crosslinked polyethylene forms fibrous nets in matrix plastics.

6. A product according to claim 1, wherein the product comprises fibers oriented in the helical direction.

7. A product according to claim 6, wherein the fibers are liquid crystalline polymer fibers or gass fibers.

* * * * *